(12) United States Patent
Roes

(10) Patent No.: US 6,844,904 B2
(45) Date of Patent: Jan. 18, 2005

(54) FAST PDLC DEVICE

(75) Inventor: John B. Roes, San Diego, CA (US)

(73) Assignee: Cubic Corporation, San Diego, CA (US)

( * ) Notice: Subject to any disclaimer, the term of this patent is extended or adjusted under 35 U.S.C. 154(b) by 31 days.

(21) Appl. No.: 10/313,771

(22) Filed: Dec. 7, 2002

(65) Prior Publication Data

US 2004/0109107 A1 Jun. 10, 2004

(51) Int. Cl.[7] .......................................... G02F 1/1333
(52) U.S. Cl. .................................. 349/86; 349/141
(58) Field of Search ...................... 349/86, 141, 147

(56) References Cited

U.S. PATENT DOCUMENTS

| | | | | |
|---|---|---|---|---|
| 4,994,204 A | 2/1991 | Doane et al. | ........... | 252/299.01 |
| 5,498,365 A | 3/1996 | Nolan et al. | ........... | 252/299.01 |
| 5,537,242 A | 7/1996 | Lim | ........................ | 359/287 |
| 5,686,017 A | 11/1997 | Kobayashi et al. | .... | 252/299.01 |
| 5,746,938 A | 5/1998 | Coates et al. | .......... | 252/299.01 |
| 5,784,138 A | 7/1998 | Kollarits et al. | ............... | 349/93 |
| 5,847,786 A | 12/1998 | Shimada et al. | ............... | 349/86 |
| 5,871,665 A | 2/1999 | Coates et al. | .......... | 252/299.01 |
| 5,963,282 A | 10/1999 | Battersby | ....................... | 349/86 |
| 5,972,240 A | 10/1999 | Kobayashi et al. | .... | 252/299.01 |
| 5,993,689 A | 11/1999 | Kobayashi et al. | .... | 252/299.01 |
| 5,999,234 A | 12/1999 | Budd et al. | ..................... | 349/38 |
| 6,042,745 A | 3/2000 | Coates et al. | .......... | 252/299.01 |
| 6,144,359 A | 11/2000 | Grave | ......................... | 345/102 |
| 6,166,789 A | 12/2000 | Koenig | ......................... | 349/86 |
| 6,187,222 B1 | 2/2001 | Coates et al. | .......... | 252/299.01 |
| 6,201,587 B1 | 3/2001 | Sakamaki | ..................... | 349/86 |
| 6,243,152 B1 | 6/2001 | Knox et al. | .................... | 349/86 |
| 6,261,650 B1 | 7/2001 | Kobayashi et al. | ........... | 428/1.5 |
| 6,271,899 B1 | 8/2001 | Lewis et al. | ................... | 349/86 |
| 6,306,469 B1 | 10/2001 | Serbutoviez et al. | .......... | 428/1.1 |
| 6,310,675 B1 * | 10/2001 | Yaniv | ......................... | 349/141 |
| 6,398,981 B1 | 6/2002 | Galstian et al. | ......... | 252/299.01 |

* cited by examiner

Primary Examiner—James Dudek
Assistant Examiner—Richard H Kim
(74) Attorney, Agent, or Firm—Thomas E. Coverstone; Townsend and Townsend and Crew

(57) ABSTRACT

A generally planar layer of a polymer dispersed liquid crystal (PDLC) material is sandwiched between a pair of opposing interior surfaces of first and second substrates, at least one of which is transparent. Electrode layers are disposed on the exterior surfaces of the substrates, with the electrode layer overlying the transparent substrate being made of a substantially transparent electrically conductive material such as Indium Tin Oxide (ITO). The first and second electrode layers are configured for receiving a first electrical signal that causes the layer of PDLC material to assume a first optical state selected from the group consisting of transparent and opaque. A plurality of conductors are disposed in the PDLC material and are configured for receiving a second electrical signal that causes the layer of PDLC material to assume a second optical state that is different than the first optical state.

19 Claims, 1 Drawing Sheet

FAST PDLC DEVICE

FIELD OF THE INVENTION

The present invention relates to displays and modulators for visible and infrared optical instruments, and more particularly, to devices of this type that utilize a polymer dispersed liquid crystal (PDLC) material.

BACKGROUND OF THE INVENTION

A PDLC material typically consists of a solid, optically clear matrix, with embedded droplets of a birefringent liquid crystal. See for example U.S. Pat. No. 4,994,204 of Doane et al. granted Feb. 19, 1991 and assigned to Kent State University. A PDLC device is usually constructed using two transparent glass or plastic plates which are spaced closely parallel and sandwich a layer of the PDLC material. The transparent plates are typically provided with a clear, electrically conductive coating of Indium Tin Oxide (ITO) on their opposing, inwardly facing surfaces. The PDLC material between the transparent plates contacts the ITO coating. Typically the layer of PDLC material has a thickness of between ten and fifty microns. The liquid crystal droplets have a size approximately equal to the wavelength in which the PDLC has to operate. Normally, the liquid crystal droplets are randomly oriented and scatter light aimed normal to the plates. When an AC signal of approximately 1 kHz is applied to the ITO coating at, for example, 10 V rms, then the liquid crystal molecules in the PDLC layer rotate and align with the induced electrical field. The bi-refringent liquid crystal and the polymer are pre-selected so that they have an equal index of refraction when the liquid crystal is aligned by an electric field. Thus, when the AC signal is applied the index of refraction is uniform for light arriving normal to the PDLC layer. This allows the PDLC device to be used as a window that can be made opaque by removing the electric field. It is also possible to build flat panel display devices for use with computers using PDLC devices. PDLC devices have also been used as shutters and modulators for visible and infrared optical instruments and related devices such as displays. They can also be used in a reflection mode to provide a display that can be used, for example, with a PC, PDA or cell phone.

For effective use in an optical application the time to clear a PDLC device and the time to close the same are important. For visible light, the time to open is typically 1/1000 second. This time can be significantly shortened using higher strength electrical fields. The closing time for a PDLC device is typically 10 mS and increases at lower operating temperatures. Currently the closing time of PDLC devices is not controlled. It would therefore be desirable to control and accelerate (shorten) the closing time of a PDLC device since this would enhance its potential performance as a light modulator. It would also be desirable to be able to control both the opening and closing times of a PDLC device.

U.S. Pat. No. 5,784,138 of Kollartis et al. granted Jul. 21, 1998 and assigned to Lucent Technologies, Inc. discloses a shutter having a thin film of PDLC composition that is capable of assuming alternative transparent and scattering states for use in a display screen of a teleconferencing system.

U.S. Pat. No. 5,537,242 of Lim grand Jul. 16, 1996 and assigned to Hughes Aircraft Company discloses a millimeter wave phase modulator including a PDLC component.

SUMMARY OF THE INVENTION

It is another object of the present invention to provide a PDLC device in which both the opening time and closing times can be controlled.

It is another object of the present invention to provide a PDLC device in which the closing time can be shortened.

It is still another object of the present invention to provide of novel method of speeding the opening and closing times of a PDLC device to improve its performance as a modulator in an optical system.

In accordance with the present invention a PDLC device includes a first substrate and a second substrate spaced closely parallel to the first substrate so that an interior surface of the first substrate opposes an interior surface of the second substrate. At least one of the substrates is made of a transparent material. A generally planar layer of a PDLC material is sandwiched between a pair of interior surfaces of the first and second substrates. A first electrode layer is disposed on an exterior surface of the first substrate. A second electrode layer is disposed on an exterior surface of the second substrate. At least the electrode layer that is disposed on the exterior surface of the transparent substrate is made of a substantially transparent electrically conductive material. The first and second electrode layers are configured for receiving a first electrical signal that creates a first electrical field that extends substantially perpendicular to a plane of the PDLC layer and has a predetermined strength sufficient to cause the layer of PDLC material to assume a first optical state selected from the group consisting of transparent and opaque. Lateral electric field generating conductors are positioned and configured for receiving a second electrical signal that creates a second electrical field that extends substantially parallel to the plane of the PDLC layer and has a predetermined strength sufficient to cause the layer of PDLC material to assume a second optical state that is different than the first optical state.

The present invention also provides a method of controlling the opening and closing of a PDLC device including a layer of PDLC material sandwiched between two substrates. A first step of my method involves creating a first electrical field that extends substantially perpendicular to a plane of the PDLC layer and has a predetermined strength sufficient to cause the layer of PDLC material to assume a first optical state selected from the group consisting of transparent and opaque. A second step of my method involves creating an alternate electrical field that extends substantially parallel to the plane of the PDLC layer and has a predetermined strength sufficient to cause the layer of PDLC material to assume a second optical state selected from the group consisting of transparent and opaque that is different than the first optical state.

DESCRIPTION OF THE PREFERRED EMBODIMENTS

Figure 1:
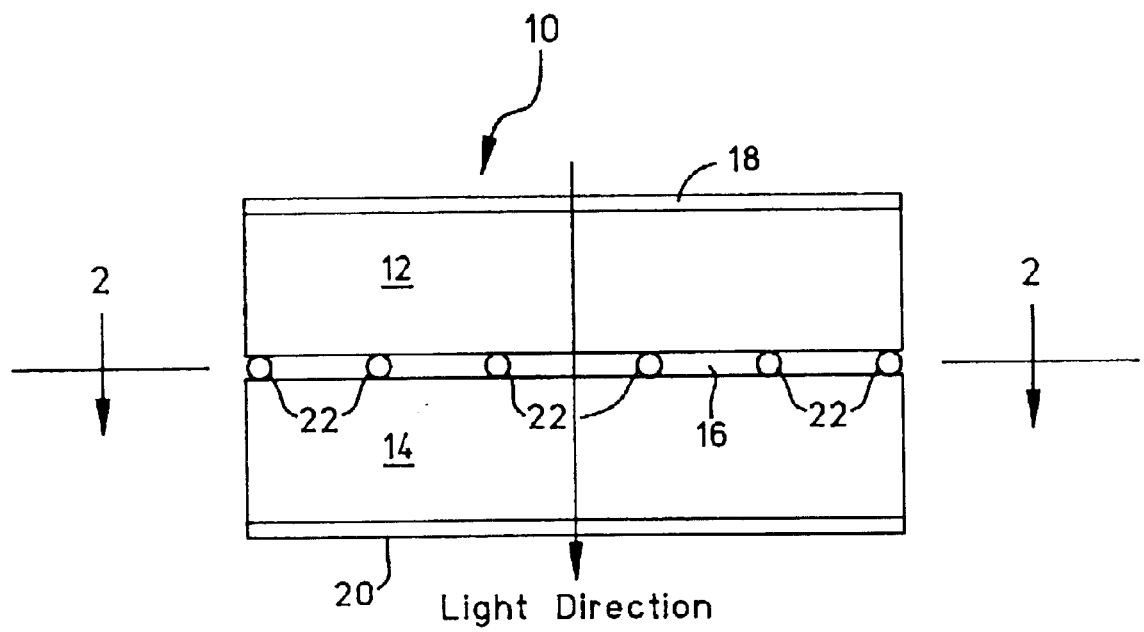
FIG. 1 is a diagrammatic cross-sectional view of a preferred embodiment my PDLC invention.

Referring to FIG. 1, in accordance with the present invention a PDLC device 10 includes a first non-conductive substrate 12 and a second non-conductive substrate 14 spaced closely parallel to the first substrate 12 so that an interior surface of the first substrate 12 opposes an interior surface of the second substrate 14. At least one of the substrates is made of a transparent material such as suitable glass or plastic. More particularly, where the device 10 is intended for use in a display device operating in a reflection mode, only one of the substrates is transparent. Where the device 10 is intended to be used as a pass through window, such as an optical modulator, both substrates 12 and 14 must be transparent. By way of example, the substrates 12 and 14 could be made of transparent polyester sheet material having a thickness of approximately 0.008 inches.

A generally planar layer 16 of a conventional PDLC material is sandwiched between a pair of interior surfaces of the first and second substrates 12 and 14. The entire disclosure of the aforementioned U.S. Pat. No. 4,994,204 is incorporated herein by reference to provide detailed disclosure on the composition and properties of PDLC material which are well known in the art. See also U.S. Pat. No. 6,398,981 of Galstian et al. granted Jun. 4, 2002 and assigned to Universite Laval which discloses holographic PDLC material, the entire disclosure of which is also incorporated herein by reference.

A first electrode layer 18 is disposed on an exterior surface of the first substrate 12. A second electrode layer 20 is disposed on an exterior surface of the second substrate 14. Where the device 10 is only used in a reflection mode, and only one of the substrates 12 and 14 is transparent, only the electrode layer that is disposed on the exterior surface of the transparent substrate is made of a substantially transparent electrically conductive material such as Indium Tin Oxide (ITO) providing approximately ninety percent transmissive capability. Otherwise other electrically conductive metals, such as Aluminum, may be deposited by vapor deposition or applied as a film to form the electrode layers. Where the device 10 is used as a window and both substrates are transparent, then both electrode layers 18 and 20 are also substantially transparent. In conventional PDLC devices the electrode layers are formed on the interior opposing surfaces of the substrates and thereby would tend to shield the PDLC layer 16 from any lateral or parallel fields. To avoid this problem, or at least reduce its undesirable effect, the substrates 12 and 14 of the present invention are coated with ITO material on the exterior surfaces thereof. Thus the electrode layers 18 and 20 are removed from the PDLC layer 16 by at least the thickness of the substrates 12 and 14.

Figure 2:
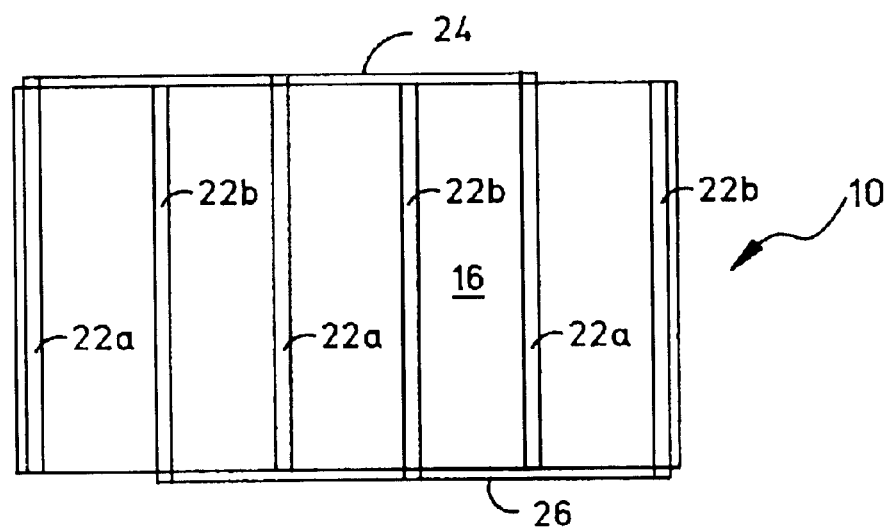
FIG. 2 is a diagrammatic cross-sectional view taken along line 2-2 of FIG. 1 illustrating the embedded wiring of the preferred embodiment used to create a lateral electrical field.

The first and second electrode layers 18 and 20 are configured for receiving a first electrical signal that creates a first electrical field that extends substantially perpendicular to a plane of the PDLC layer 16 and has a predetermined strength sufficient to cause the layer 16 of PDLC material to assume a first optical state, preferably, transparent or open. Referring to FIG. 2, a plurality of conductors 22 are disposed in the PDLC material and are configured for receiving a second electrical signal that creates a second electrical field that extends laterally, i.e. substantially parallel to the plane of the PDLC layer 16 and has a predetermined strength sufficient to cause the layer 16 of PDLC material to assume a second optical state, preferably opaque, that is different than the first optical state.

Referring to FIG. 2, a plurality of conductors 22, which are preferably made of wire made of a noble metal such as Gold or Platinum, and are spaced apart and extend generally parallel. The diameter of the wire is substantially equal to a thickness of the layer 16 of PDLC material, e.g. 0.001 inches. The conductors also serve as spacers that maintain the substrates 12 and 14 closely parallel. The conductors 22 are preferably spaced apart a distance that is larger than the diameter of the wire. By way of example, the conductors 22 may be spaced apart by 0.01 inches. A first set of the conductors 22 consisting of odd numbered wires 22a are connected in parallel via lead 24 and a second set of the conductors 22 consisting of even numbered wires 22b are connected in parallel via lead 26. The second electrical signal is applied across the first and second sets of conductors 22 via leads 24 and 26.

To clear or open the PDLC device 10, another AC signal can be applied across the electrode layers 12 and 14 to induce ten volts rms across the PDLC layer 16. This may require an AC signal of approximately 170 volts, for example. This places the PDLC layer in a transparent state. An AC voltage of 100 volts rms, for example, can be applied across the two sets of embedded parallel conductors 22a and 22b. The induced electrical field aligns the crystals in the PDLC layer 16 parallel the planes of the substrates 12 and 14, resulting in strong attenuation and scattering of light that enters the PDLC normal to the plane of the PDLC layer 16. This places the PDLC layer 16 in an opaque state. The opening and closing times in this example are roughly equal and can be readily controlled.

To further reduce the response times of the PDLC device 10 the applied voltage can be increased to where they approach the breakdown voltage of the PDLC layer 16. The purity of the PDLC layer 16 and the precise chemical composition thereof will determines the breakdown voltages, along with the physical dimensions and configuration of the device 10. Voltages of several kilovolts can be safely applied resulting in response times of less than 100 microseconds. If the required open time of the PDLC device 10 is less than a few thousandths of a second it is sufficient to momentarily apply a DC voltage to the electrodes to simplify the control circuitry. For safety reasons, and in order to avoid undesirable corona effects, a high impedance voltage source and insulation can be provided to the conductors and wiring (not illustrated) exterior of the device 10 that connect to the electrode layers 18 and 20 and the conductors 22.

The present invention also provides a method of controlling the opening and closing of a PDLC device such as 10 including a layer 16 of PDLC material sandwiched between two substrates such as 12 and 14. A first step of my method involves creating a first electrical field that extends substantially perpendicular to a plane of the PDLC layer 16 and has a predetermined strength sufficient to cause the layer 16 of PDLC material to assume a first optical state. A second step of my method involves creating a second electrical field that extends substantially parallel to the plane of the PDLC layer 16 and has a predetermined strength sufficient to cause the layer 16 of PDLC material to assume a second optical state different than the first optical state.

While I have described preferred embodiments of my PDLC device and method, it should be apparent to those skilled in the art that my invention can be modified in both arrangement and detail. For example my invention could have a converse arrangement, i.e. the first state could be opaque instead of transparent and the second state could be transparent instead of opaque. Other lateral electric field generating means may be used in place of the embedded parallel conductors 22. Therefore, the protection afforded my invention should only be limited in accordance with the scope of the following claims.

I claim:

1. A PDLC device comprising:
   a first substrate;
   a second substrate spaced closely parallel to the first substrate so that an interior surface of the first substrate opposes an interior surface of the second substrate;
   at least one of the substrates being made of a transparent material;

a generally planar layer of a PDLC material sandwiched between a pair of interior surfaces of the first and second substrates;

a first electrode layer disposed on an exterior surface of the first substrate;

a second electrode layer disposed on an exterior surface of the second substrate;

at least the electrode layer that is disposed on the exterior surface of the transparent substrate being made of a substantially transparent electrically conductive material;

the first and second electrode layers being configured for receiving a first electrical signal that creates a first electrical field that extends substantially perpendicular to a plane of the PDLC layer and has a predetermined strength sufficient to cause the layer of PDLC material to assume a first optical state selected from the group consisting of transparent and opaque; and lateral electric field generating means positioned and configured for receiving a second electrical signal that creates a second electrical field that extends substantially parallel to the plane of the PDLC layer and has a predetermined strength sufficient to cause the layer of PDLC material to assume a second optical state selected from the group consisting of transparent and opaque that is different than the first optical state.

2. The PDLC device of claim 1 wherein the PDLC layer is transparent when in the first optical state and the PDLC layer is opaque when in the second optical state.

3. The PDLC device of claim 1 wherein both substrates are made of a transparent material and the first and second electrode layers are both made of the substantially transparent electrically conductive material.

4. The PDLC device of claim 1 wherein the substantially transparent electrically conductive material is Indium Tin Oxide (ITO).

5. The PDLC device of claim 1 wherein the lateral electric field generating means includes a plurality of conductors disposed in the PDLC material.

6. The PDLC device of claim 5 wherein the plurality of conductors are made of wire and are spaced apart and extend generally parallel.

7. The PDLC device of claim 6 wherein a diameter of the wire is substantially equal to a thickness of the layer of PDLC material.

8. The PDLC device of claim 6 wherein a first set of the conductors consisting of odd numbered wires are connected in parallel and a second set of the conductors consisting of even numbered wires are connected in parallel and the second electrical signal is applied across the first and second sets of conductors.

9. The PDLC device of claim 6 the conductors are spaced apart a distance that is larger than a diameter of the wire.

10. The PDLC device of claim 1 wherein the transparent material of which at least one of the substrates is made is selected from the group consisting of glass and plastic.

11. A method of controlling the opening and closing of a PDLC device including a layer of PDLC material sandwiched between two substrates comprising:

creating a first electrical field that extends substantially perpendicular to a plane of the PDLC layer and has a predetermined strength sufficient to cause the layer of PDLC material to assume a first optical state selected from the group consisting of transparent and opaque; and creating a second electrical field that extends substantially parallel to the plane of the PDLC layer and has a predetermined strength sufficient to cause the layer of PDLC material to assume a second optical state selected from the group consisting of transparent and opaque that is different than the first optical state, wherein the first electrical field is created by applying a first signal across first and second electrode layers overlying corresponding exterior surfaces of the first and second substrates, respectively.

12. The method of claim 11 wherein the second electrical field is created by applying the second signal to a plurality of conductors disposed in the PDLC material.

13. The method of claim 12 wherein the plurality of conductors are made of wire and are spaced apart and generally parallel.

14. The method of claim 11 wherein the first electrical field is created by applying the first signal across first and second electrode layers overlying corresponding exterior surfaces of the first and second substrates, respectively, and the second electrical field is created by applying the second signal to a plurality of conductors disposed in the PDLC material.

15. The method of claim 11 wherein the first electrical signal is an AC voltage of a predetermined magnitude near a breakdown voltage of the PDLC layer.

16. The method of claim 11 wherein the second electrical signal is an AC voltage of a predetermined magnitude near a breakdown voltage of the PDLC layer.

17. The method of claim 11 wherein the first optical state is transparent and the second optical state is opaque.

18. The method of claim 13 wherein a first set of the conductors consisting of odd numbered wires are connected in parallel and a second set of the conductors consisting of even numbered wires are connected in parallel and the second electrical signal is applied across the first and second sets of conductors.

19. A PDLC device comprising:

a first substrate;

a second substrate spaced closely parallel to the first substrate so that an interior surface of the first substrate opposes an interior surface of the second substrate;

at least one of the substrates being made of a transparent material;

a generally planar layer of a PDLC material sandwiched between a pair of interior surfaces of the first and second substrates;

a first electrode layer disposed on an exterior surface of the first substrate;

a second electrode layer disposed on an exterior surface of the second substrate;

at least the electrode layer that is disposed on the exterior surface of the transparent substrate being made of a substantially transparent electrically conductive material;

the first and second electrode layers being configured for receiving a first electrical signal that creates a first electrical field that extends substantially perpendicular to a plane of the PDLC layer and has a predetermined strength sufficient to cause the layer of PDLC material to assume a first optical state selected from the group consisting of transparent and opaque; and a plurality of conductors disposed in the PDLC material and configured for receiving a second electrical signal that creates a second electrical field that extends substantially parallel to the plane of the PDLC layer and has a predetermined strength sufficient to cause the layer of PDLC material to assume a second optical state selected from the group consisting of transparent and opaque that is different than the first optical state, the plurality of conductors being made of wire being spaced apart and extend generally parallel, and further wherein a first set of the conductors consisting of odd numbered wires are connected in parallel and a second set of the conductors consisting of even numbered wires are connected in parallel and the second electrical signal is applied across the first and second sets of conductors.

* * * * *